United States Patent [19]

Ferre et al.

[11] 4,096,484
[45] Jun. 20, 1978

[54] GRAPHIC RECORDING SYSTEM

[75] Inventors: Radford G. Ferre; Brent Rudy Miller, both of Sandy, Utah

[73] Assignee: Edo Western Corporation, Salt Lake City, Utah

[21] Appl. No.: 735,265

[22] Filed: Oct. 26, 1976

[51] Int. Cl.² ........................... G01D 9/00; G01S 9/66
[52] U.S. Cl. ................................. 346/33 EC; 340/3 F
[58] Field of Search .................... 346/33 EC; 340/3 F

[56] References Cited

U.S. PATENT DOCUMENTS

| | | | |
|---|---|---|---|
| 2,570,500 | 10/1951 | Smith | 346/33 EC X |
| 2,958,846 | 11/1960 | Luskin | 346/33 EC UX |
| 3,005,973 | 10/1961 | Kietz | 346/33 EC UX |
| 3,324,451 | 6/1967 | Richard | 346/33 EC |
| 3,363,226 | 1/1968 | Murphree | 346/33 EC |
| 3,683,403 | 8/1972 | Okino | 346/33 EC |
| 3,735,334 | 5/1973 | Ahrens et al. | 346/33 EC X |
| 3,990,082 | 11/1976 | Ramberg | 346/33 EC X |

FOREIGN PATENT DOCUMENTS 47-396  10/1968  Japan ............................ 346/33 EC

*Primary Examiner*—George H. Miller, Jr.
*Attorney, Agent, or Firm*—Criddle, Thorpe & Western

[57] ABSTRACT

A graphic recording system for use with a multiple channel underwater sonar system. The recording system includes a plurality of memories, each for storing information received over a different channel of the sonar system. One or more channels may carry side scan sonar information, while another may carry sub-bottom sonar information, etc. The information from the channels is received and stored in the memories simultaneously. The recording system further includes a graphic line recorder which is responsive to the receipt of a sequence of signals for producing on chart paper a line trace representation of the signals. A control unit controls the storage of information in and retrieval of information from the memories and application of the information to the graphic line recorder in such a manner that the information may be applied to the recorder in various sequences and at various rates. This allows the production of graphic displays of information from selected information channels, and having selectable distance or time scale factors. The recording system also includes data inverting apparatus for selectively inverting information supplied to the recorder so that either so-called positive or negative traces can be produced.

17 Claims, 7 Drawing Figures

GRAPHIC RECORDING SYSTEM

BACKGROUND OF THE INVENTION

This invention relates to graphic recording systems and especially to a system adapted for graphically recording information received over a plurality of information channels.

Electro-graphic line recording systems are frequently utilized with underwater sonar systems for recording in graphical form information relating to horizontal sea bed topography and sub-bottom structure or bathymetric profile. This is accomplished by towing a so-called "towed vehicle" containing sonar transducers behind a ship (or by mounting the transducers on the ship) while the transducers transmit sonar or acoustical signals toward the sea floor and receive reflections from the floor and from sub-floor layers. This received information is then transmitted to a graphic line recorder which records the information in the form of line traces on chart paper.

The graphic line recorders typically consist of a mechanical stylus which moves across the surface of chart paper which itself is moving in a direction generally perpendicular to the movement of the stylus. As the stylus moves across the paper, it records on the paper a line trace varying in darkness along the length of the trace to indicate the location of objects or sub-bottom layers encountered by the transmitted acoustical signals.

With the above-described prior art systems, the received information is recorded in real time as it is received from the transducers. Because of this, the distance scale factor for the tracings can be changed or varied only by changing the speed of travel of the stylus. For example, if a distance were to be represented on the chart in a narrow space, then the stylus would be moved at low speed whereas if the distance were to be represented in a wider space, then the stylus would be moved at a higher speed. Changing distance scale factors by changing stylus speed places upper limits on what scale factor (range) can be achieved because of the practical upper limits on the speed at which the stylus can be moved. Also, if different scale factors were to be used for each channel (whose information would be recorded in side by side spaces on the chart paper) then the stylus would have to move through one of the spaces corresponding to one of the channels at one speed, and then through an adjacent space corresponding to a different channel at a different speed, etc. In other words, the stylus would be controlled to change speeds as it made one pass over the chart paper. The control of such changes in speed is difficult and costly.

Another drawback of prior art recording systems also arises from the real time nature of their operation. Because the sonar information is recorded on the chart paper as it is received from the towed vehicle as already mentioned, only one transducer at a time can be operated. Thus, a side-looking transducer may be operated followed by the other side-looking transducer, in turn, followed by a sub-bottom or bathymetric transducer. The information sequentially received from the operation of these transducers is then sequentially applied to the graphic line recorder unit. Of course, because the transducers must be operated in sequence rather than simultaneously, either the sonar beams must be fairly wide in order to get complete coverage from one transmission of a transducer to the next transmission, or the towed vehicle must be moved fairly slowly. In other words, to get complete coverage of the sea floor, the towed vehicle should not be moved more than the width of a sonar beam between transmission (and receptions) by a transducer. Of course, the wider the sonar beam, the faster can the towed vehicle be moved. However, better resolution is obtained with a narrow beam and so it is preferable to use a narrower beam and, if possible, make more transmissions (and receptions). And, it would be especially desirable to be able to transmit simultaneously from a plurality of transducers in the towed vehicle rather than sequentially as is presently done with most prior art systems. It should be mentioned here that with so-called helix recorders, simultaneous transmission, at least from the side-looking transducers, is possible, but change of scale factors must still be done by varying the speed of movement of the recording element (helix drum).

A final comment may be made about prior art systems with regard to the so-called center-out side scan displays. With a recorder unit which utilizes a single stylus belt, the center-out side scan display is not possible. Rather, a "stacked" side by side display is produced and this is more difficult to read since there is a discontinuity between the two side scan tracings. Center-out side scan displays can be obtained with the previously-mentioned helix recorders (see "Electrosensitive Graphic Recording" by Fred W. Simpkins, *Measurement and Data*, September-October, 1969) but such recorders require "wet" chart paper which some users find undesirable.

SUMMARY OF THE INVENTION

It is an object of the present invention to provide a new and improved graphic recording system for recording information received over a plurality of information channels.

It is another object of the present invention to provide such a recording system in which the information may be received simultaneously from the channels and then recorded in selectable sequences.

It is a further object of the present invention to provide such a recording system adapted to operate with underwater sonar equipment having two side-looking transducers and to record "center out" side scan displays.

It is also an object of the present invention to provide a graphic line recording system adapted to record multiple records of information side by side on a recording medium, each of which may have different and selectable scale factors.

It is still another object of the present invention to provide such a recording system in which the information recorded on the recording medium may selectably be positive line traces or negative line traces.

It is an additional object of the present invention to provide such a recording system having a recording instrument for recording line traces representing received information, such system being adapted to continuously vary the rate at which information is supplied to the recording instrument during each line trace produced.

The above and other objects of the present invention are realized in a specific illustrative embodiment of a graphic line recording system adapted to operate with underwater sonar systems as well as other systems. The recording system includes a memory for storing information received over an information channel, such information for example representing acoustical signals reflected from a sea floor, apparatus for recording on a recording medium a graphic representation of information sequentially applied thereto, and control apparatus for applying information to and reading information from the memory and for applying the information sequentially to the recording apparatus at selectable rates. The feature of varying the rate at which information is stored in and read from memory and then supplied to the recording apparatus enables the selection of different distance or time scale factors as desired by the user. In accordance with one aspect of the invention, additional memories are included in the recording system, each for storing information from a different information channel. The control apparatus is adapted to read information from the different memories in selectable sequences and to apply the information to the recording apparatus at different and selectable rates. Thus information from one memory, and thus from one channel, may be recorded with one scale factor on the recording medium while information from a different memory, and thus a different information channel, is recorded with a different scale factor, etc.

When the illustrative embodiment discussed above is utilized with underwater sonar systems having two side-looking transducers, reflected acoustical energy produced by the transducers may be stored in the memories and then read out and applied to the recording apparatus in such a manner as to produce so-called center-out side scan displays. Also, by providing an inverting device between the memories and the recording apparatus, the displays or graphic representations produced by the recording apparatus may be either positive or, if inverted, negative. Also, with the system described, information may be received and stored in the memories simultaneously from the different information channels and then be applied sequentially to the recording apparatus. Additional novel features of the invention will become clear from a consideration of the drawings and detailed description which follows.

BRIEF DESCRIPTION OF THE DRAWINGS

The above and other objects, features and advantages of the present invention will become apparent from a consideration of the following detailed description presented in connection with the accompanying drawings in which.

DETAILED DESCRIPTION

Figure 1:
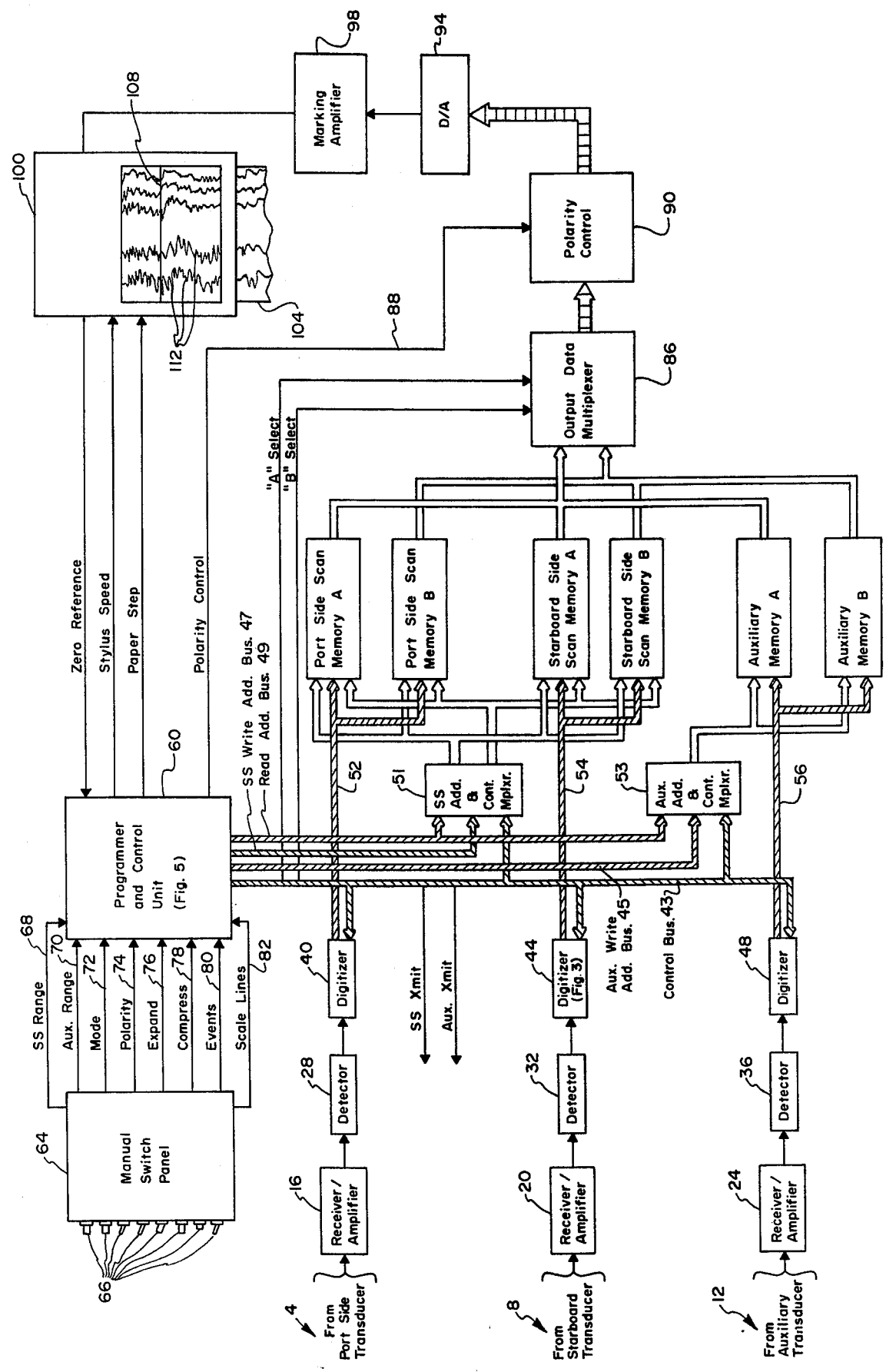
FIG. 1 is a block diagram of a graphic recording system constructed in accordance with the present invention and adapted to operate with an underwater sonar system having two side scan transducers and an auxiliary transducer.

The FIG. 1 block diagram representation of a graphic line recording system is adapted to record information received over three information channels, each channel representing information produced by acoustical reflection of sonar signals from the sea floor and perhaps from sub-floor or sub-bottom layers of the earth. Of course, the graphic recording system could be utilized with more or less information channels and with information channels bearing any type of information. The three channels indicated in FIG. 1 by the numerals 4, 8 and 12, represent information produced respectively by a port side transducer of a so-called towed vehicle of an underwater sonar system, a starboard transducer of the towed vehicle, and an auxiliary transducer (for bathymetric or sub-bottom information) of the towed vehicle. The port side and starboard transducers generate side-looking sonar or acoustical signals which are transmitted laterally and downwardly from different sides of the towed vehicle to produce reflected acoustical signals for indicating topographical features of the sea floor. The auxiliary transducer generates a downwardly directed sonar signal which is reflected back upwardly from either the sea floor (for bathymetric information) or from the various sub-bottom layers of the earth (for sub-bottom information). The reflected acoustical signals are received by the respective transducers and applied to receiver/amplifiers 16, 20 and 24. These units are conventional devices for receiving and controlling the amplitude of the analog signals generated by the transducers in response to the reflected acoustical signals.

The analog signals are applied by the receiver/amplifiers to respective detectors 28, 32 and 36 and then to respective digitizers (analog to digital converters with timing logic) 40, 44 and 48. The detectors function in a conventional manner to detect the envelopes of the applied analog signals. The digitizers similarly function in a conventional manner to convert the detected analog information signals to corresponding digital signals for application to respective memories for storage. The shaded conductors 52, 54 and 56 indicate that the digital information from the digitizers may be applied to the memories in the form of multi-bit words where the bits of each word are applied in parallel to the memories.

Application of information to the various memories is carried out under control of a programmer and control unit 60 which, in turn, receives control directions from a manual switch panel 64. These control directions principally concern the type of graphic record desired, i.e., the scale factors for the different channels, whether portions of the record are to be compressed, which channels are to be recorded, etc. Controlling the type of graphic record produced in the present invention principally involves controlling the manner in which information is "digitized" (converted from analog to digital form) and applied to the memories, and the manner in which information is read from the memories and applied to the recording apparatus.

Three different pairs of memories are provided, with each pair dedicated to a different one of the information channels. Thus, port side scan memory A and port side scan memory B are dedicated to receiving and storing information produced by the port side transducer and channel 4, starboard side scan memory A and starboard side scan memory B are dedicated to receiving and storing information produced by the starboard transducer and information channel 8, etc. A side scan address and control multiplexer 51, in response to address and control information received from the programmer and control unit 60 over a control bus 43, a side scan write address bus 47 and a read address bus 49, determines in which of the side scan memories data is to be stored and from which data is to be read. Similarly, an auxiliary address and control multiplexer 53, in response to address and control information received over buses 43 and 49, and an auxiliary write address bus 45, determines in which of the auxiliary memories data is to be stored and from which data is to be read.

For each pair of memories of a channel, while one of the memories is receiving and storing information, the other memory may be applying information to the recording apparatus. Then, after the one memory is filled and the other "emptied", information is directed to the "empty" memory, while the information in the filled memory is applied to the recording apparatus (if nondestructive read memories are used, the memories are not actually emptied but rather new information is simply written over old information).

Information is read from only one of the individual memories at a time under control of the programmer and control unit 60 and applied via an output data multiplexer 86 to a polarity control unit 90. Thus, information may be read from port side scan memory A, then from starboard side scan memory A, and then from auxiliary memory A and applied in sequence to the output data multiplexer 86 and then to the polarity control unit 90. The polarity control unit 86 either passes the digital information unchanged to a digital-to-analog converter or inverts the bits of the digital information before passing the information to the digital-to-analog converter. Whether or not the information is inverted is determined by a control signal applied by the program and control unit 60 via a polarity control lead 88 to the polarity control unit 90. When the information is not inverted, positive displays or traces (black on white) are produced whereas when the information is inverted, negative displays (white on black) are produced. This feature allows the user to produce the type of display or graphic recording which he feels best serves his needs.

The digital information applied by the polarity control unit 90 to the digital-to-analog convertor 94 is converted to corresponding analog signals for application to a marking amplifier 98. The marking amplifier 98 in response to the signals, controls a conventional stylus contained in a stylus recorder unit 100. The recorder unit 100 produces line traces on chart paper 104, with the darkness of the trace indicating the presence of objects or different layers encountered by the acoustical signals transmitted by the sonar transducers. The digital-to-analog convertor 94, marking amplifier 98 and stylus recorder unit 100 are all conventional apparatus. For example, the unit 100 could be the model 550 stylus recorder produced by EDO Western Corporation of Utah.

The different type of control directions applied by the manual switch panel 64 to the programmer and control unit 60 will now be briefly discussed. The manual switch panel 64 is simply a unit having a number of manually operable control knobs and switches 66 to enable a user to select the conditions under which the display or graphic recording will be produced. Setting of the knobs and switches 66 causes various signals to be applied to the programmer and control unit 60 which then controls the conditions under which the display is produced. A "side scan range" lead 68 carries signals to the programmer and control unit 60 to indicate the range which the two side scan displays are to have, i.e., the distance to be represented on the display for the side scan information and thus also the separation on the chart paper of scale lines 112. The "auxiliary range" lead 70 indicates the range which the auxiliary display is to have and again the separation on the chart paper of the scale lines. For both the side scan range and the auxiliary range, any one of a plurality of different ranges may be selected by manually setting control knobs on the manual switch panel 64. If a long range is selected, then the analog signals received from the channels and applied to the digitizers must be "sampled" less frequently for digitizing and the digitized signals thus stored at a slower rate in the memories. This is apparent since for a long range, a longer time is needed to receive back the reflected acoustical signals. If a short range is selected, then the received analog signals must be "sampled" more frequently and the digitized signal stored at a faster rate. The rate of reading the information from the memories for application to the recorder unit 100 must be sufficiently high so that one memory of each pair will always be "emptied" in time to receive and store digitized information from the corresponding digitizer. The range selections also affect the speed at which the stylus is moved across the chart paper, being slower for long ranges and faster for short ranges. It should be noted here that the rate of storing information corresponds to the acoustical signal transmission rate, i.e., the time between consecutive transmissions from a transducer corresponds to the time over which information from that transducer (channel) is stored.

The "mode" lead 72 determines one of the following three display modes to be recorded on the chart paper: (1) Side scan only — displays only side scan data on the full width of the chart paper; (2) Split trace — displays side scan data on one half (or other portion as desired by the user) of the chart paper and auxiliary (bathymetric/sub-bottom) data on the other half of the chart paper; (3) Auxiliary only — displays only auxiliary data on the chart paper. Selection of the display mode contributes to determining the stylus speed. Thus, if "side scan only" is the mode, the side scan range setting determines the stylus speed. If "split trace" is the mode, the range setting of the side scan and auxiliary ranges which is the greater determines the stylus speed. Finally, if "auxiliary only" is the mode, the auxiliary range setting determines the stylus speed.

Figure 2:
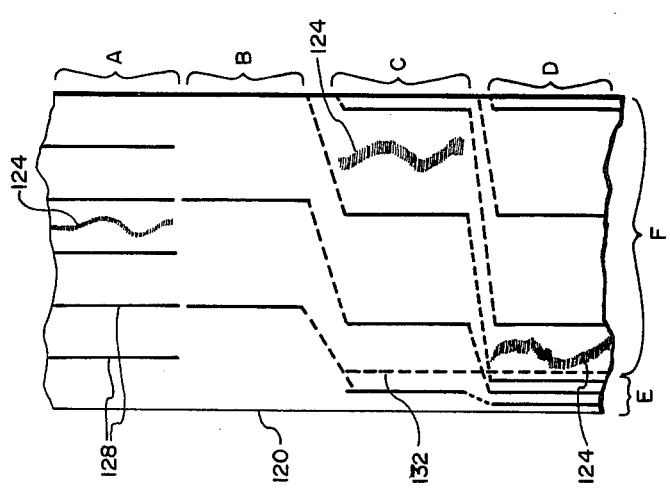
FIG. 2 shows an exemplary graphic record made utilizing the system of the present invention.

FIG. 2 shows an illustrative section 120 of chart paper of the recorder unit 100 with a data tracing 124 and scale lines 128 shown for an "auxiliary only" display. Section A of the chart shows scale lines 128 for one range setting, with the distance between scale lines representing a fixed distance of the range over which the acoustical signals are transmitted. Section B of the chart shows scale lines for a range setting which is one-half the range of section A. Thus in section B, the scale line separation, still representing the same fixed distance, is twice that of section A. The other sections of the FIG. 2 chart will be discussed later.

The "polarity" lead 74 carries signals to establish whether the side scan displays will be positive or negative as previously described.

The "expand" lead 76 controls whether or not the system is to operate in a so-called "expand" mode in which a portion of the auxiliary display is reduced or compressed. Control of the amount of compression is effected by "compress" leads 78 which, when an "increase" signal is applied thereover to the programmer and control unit 60, causes a portion of the auxiliary display to compress. When a "decrease" signal is present on the leads 78, the amount of compression is decreased, i.e., less range or distance is compressed in the "compressed" portion of the auxiliary display. The effect of operating in the "expand" mode and compressing a portion of the auxiliary display is to compress into a narrow portion of the chart paper any record of reflected acoustical signals in the range from the transducer downward a certain distance and then to display in the normal fashion the record of reflected acoustical signals is the range from that certain distance downward further a distance corresponding to the auxiliary range setting (lead 70). The reason for doing this is that a significant portion of the normal display range may only represent the distance from the transducer to the sea floor, for example, and this portion may carry no wanted information. Therefore, the "compress" lead 78 enables selection of how much of the display (e.g. from the transducer to the sea floor) is to be compressed into a fairly narrow space while the range below the sea floor is displayed in the normal fashion to give the detail desired for this range.

Section C of the chart 120 of FIG. 2 illustrates some compression of the display into a portion E at one side of the chart. Section D illustrates further compression of the display into portion E. The range displayed in Section C on portion F of the chart is thus of one depth whereas the range displayed in section D on portion F is of a greater depth since more of the display in the latter case has been compressed. Note that the separation of scale lines remains the same, regardless of the amount of compression, unless the auxiliary range setting is changed. Also note that even though a portion of the display is compressed, scale lines are retained in the compressed portion E so that a user can readily determine the amount of compression directly from the chart.

The "event marker" lead 80 (FIG. 1) provides for the recording apparatus to automatically place a line 108 across the width of the chart paper for "flagging" a portion of the record which the user desires to refer to later. Finally, the "scale lines" lead 82 simply provides for the inclusion or omission of scale lines 112 on the side scan and sub-bottom displays. That is, the recording unit 96 will either omit scale lines from the displays or automatically record such scale lines in accordance with control signals applied over the lead 82 to the programmer and control unit 60.

Figure 3:
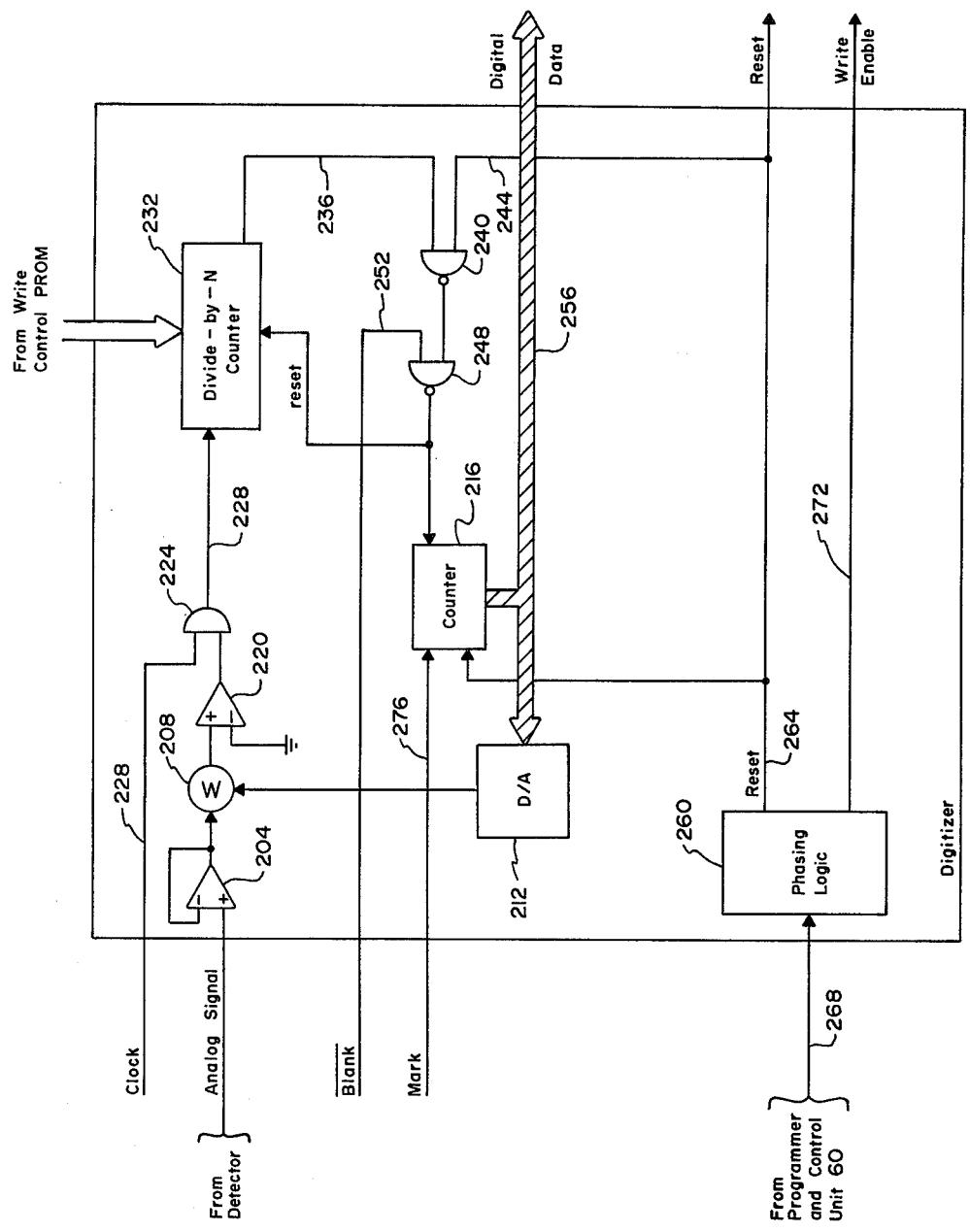
FIG. 3 shows in detail an exemplary circuit embodiment for the digitizers of FIG. 1.

Shown in FIG. 3 is an illustrative circuit which may be used for the digitizers 40, 44 and 48 of FIG. 1. As indicated earlier, the digitizers convert analog input signals, representing reflected acoustical information, into digital equivalents thereof. The digitizer of FIG. 3 includes a unity gain operational amplifier 204 which couples the detected analog signal received from the corresponding detector to a summation junction circuit 208. The other input to the summation circuit 208 is provided by a digital-to-analog converter 212 which produces an output analog signal corresponding to the magnitude of the count in a counter 216. The signal produced by the digital-to-analog converter 212 is of a polarity opposite that of the signal produced by the amplifier 204 so that when the magnitude of the signal from the amplifier 204 is greater than the magnitude of the signal from the converter 212, a positive signal is applied by the circuit 208 to a comparator 220. When the signal from the converter 212 reaches the magnitude of the signal from the amplifier 204, a zero level signal is applied by the circuit 208 to the comparator 220.

The comparator produces a logical "1" output when the input signal on its positive input terminal is greater than the input signal on its negative input terminal (which, in this case, is zero or ground level). When the input on the positive input terminal is equal to or less than the input on the negative input terminal, the comparator 220 produces a logical "0" output. The output of the comparator 220 is applied to an AND gate 224 to either enable transfer of a clock signal received over lead 228 to a divide-by-N counter 232 (when the output of the comparator 220 is a logical "1") or to prevent such transfer (when the output of the comparator is a logical "0").

The divide-by-N counter 232 counts down, beginning from a count of N, to a count of zero at which time the counter produces an output signal on lead 236. The count N from which the counter 232 begins counting is determined by an input count received from a write control PROM (programmable read only memory) of the programmer and control unit 60 (to be discussed later). The output of the counter 232 (logical "1") is applied to a NAND gate 240 which, when no reset signal is present on lead 244 (logical "1") produces a logical "0" output. This causes a NAND gate 248 to produce a logical "1" output, providing the signal on lead 252 is a logical "1", which causes the counter 216 to increase its count by one and also causes the counter 232 to reset to N. In other words, each time the counter 232 counts down to zero, the counter 216 is incremented by one.

The counter 216 applies its output count to the digital-to-analog converter 212 and also to an output bus 256 for application to a corresponding pair of memories described earlier. When the count in the counter 216, and thus the magnitude of the output of the converter 212, reaches a level equal to the magnitude of the output of the amplifier 204, the logic 224, as discussed earlier, prevents application of clock pulses from lead 228 to the divide-by-N-counter 232 and so the count in counter 216 ceases to increase. In this manner, a digital value is produced by the digitizer of FIG. 3 which is equivalent to the magnitude of an input analog signal.

Phasing logic 260 is provided to periodically reset the counter 216 and inhibit application of incrementing pulses from the counter 232 to the counter 216. The phasing logic produces a reset signal (logical "0") on lead 264 in response to a signal received over lead 268 from the programmer and control unit 60. As will become clear later on, a signal is applied to lead 268 for each "sample" taken by digitizer of the input analog signal, i.e., for each digital sample to be written into the memories. Of course, for each acoustical transmission and reflection by a transducer, numerous "samples" of the resulting analog signal are taken to produce the equivalent digital values which are then temporarily stored in a corresponding memory. The reset logical "0" on lead 244 causes the NAND gate 240 to generate a logical "1" output until the logical "0" input is removed.

The phasing logic 260 also produces a "write enable" signal on output lead 272 in response to the input signal or lead 268. This "write enable" signal is applied to the memories to enable the memories to store the count (digital data) present in the counter 216. The phasing logic might simply comprise delay circuitry for enabling production first of the "write enable" signal and then the reset signal in response to the signal supplied over lead 268. Alternatively, the phasing logic might include circuitry responsive to different clock frequencies (which would be supplied to the logic 260 over leads not shown) for first producing the "write enable" signal and then the reset signal.

The rate at which "samples" of the input analog signal are taken and thus the rate at which the equivalent digital data are written into the memories is determined by the value of N supplied to the divide-by-N counter 232 and by the frequency of application of the signal over lead 268. If N is smaller, then the counter 216 is caused to increment at a faster rate so that "samples" of the input analog signal are taken more rapidly, etc. The more frequently signals are applied to lead 268, the more frequently are the memories enabled to store digital data from the counter 216. Controlling the rate of sampling and storing the data enables controlling the scale factors on the resulting displays as previously described.

The input lead labelled "blank" is provided to inhibit operation of the counter 216 and thus inhibit production of digital data counts on output bus 256. When a logical "0" is applied to lead 252, the NAND gate 248 will be caused to produce and maintain a logical "1" output so that the counter 216 cannot be incremented. This is done, for example, when one type of data (such as auxiliary information) is not to be produced on the chart paper (which would be the case for auxiliary information if the display mode were "side scan only").

The remaining input lead to the digitizer of FIG. 3, identified by the numeral 276, is provided to drive the counter 216 to its maximum count and maintain it there as long as a "marking" signal is present on the lead. The purpose of this is to cause the storage of data which will result in the production of a dark line or mark across the chart paper to "flag" some part of the record as earlier discussed. The "marking" signal is applied to lead 276 when the user operates the manual switch panel 64 (FIG. 1) to produce an "event marker" signal on lead 80. Maximum digital values stored in the memories and then read therefrom to the recording unit 100 cause the recorder stylus to record the darkest shade possible on the chart paper during a scan.

Figure 4:
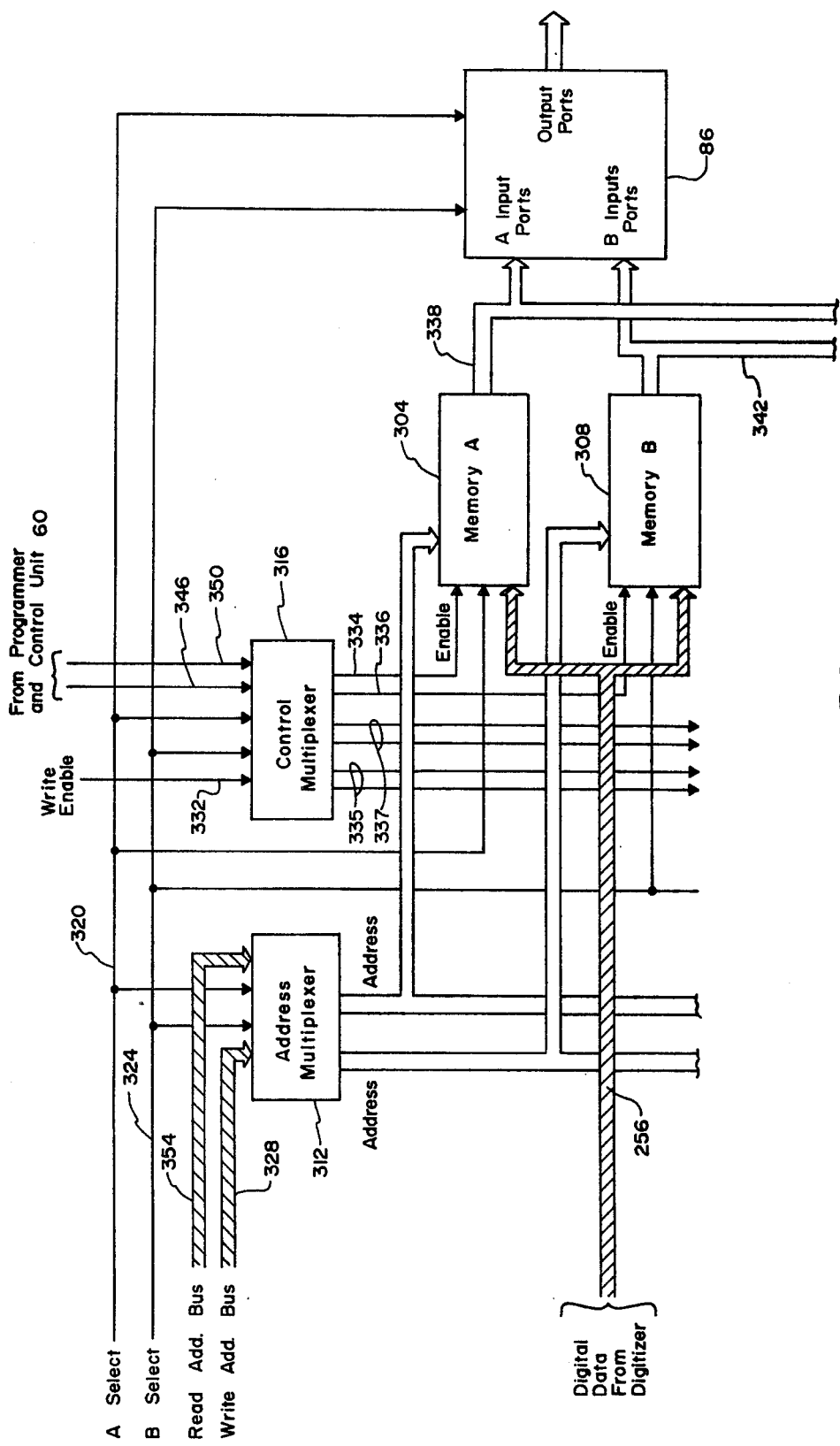
FIG. 4 shows in detail exemplary circuitry for the multiplexers and memories of FIG. 1.

FIG. 4 shows a pair of memories and associated write and read control circuitry for an information channel of the system of the present invention. The two memories 304 and 308 shown may be either the port side, starboard or auxiliary memories shown in FIG. 1. An address multiplexer 312 could be part of the side scan address and control multiplexer 51 (FIG. 1) or part of the auxiliary address and control multiplexer 53. A control multiplexer 316 (FIG. 4) is common to both multiplexers 51 and 53 shown in FIG. 1. Digital data is supplied to the memories 304 and 308 over a data bus 256 which comes from a counter, such as counter 216 of FIG. 3, of a corresponding digitizer. The data is supplied to both memories but only one of the memories is enabled at a time to store the data. Also, when one of the memories is enabled to store data, the other memory is enabled to read data therefrom. If data is to be written into memory A (304), then a logical "0" is applied to an "A select" lead 320 and a logical "1" is applied to a "B select" lead 324. If the data is to be written into memory B (308), then a logical "0" is applied to lead 324 and a logical "1" is applied to lead 320. The "select" signals are produced by the programmers and control unit 60 (FIG. 1) and supplied over control bus 43.

The location or address in a memory where the data is to be stored is determined by information supplied over a write address bus 328 (FIG. 4) to the address multiplexer 312 which, in response to this information, activates the designated address in the memory to store the data present on the data bus 256. The multiplexer 312 supplies the "write address" information to the memory in which data is to be stored as designated by the A and B select leads 320 and 324. The address information is supplied by the programmer and control unit 60 (FIG. 1). The control multiplexer 316 (FIG. 4), in response to a "select" signal over one of the leads 320 or 324 and to a "write enable" signal over lead 332, enables either memory A or memory B to, by way of lead 334 or lead 336, store data in the designated address.

Reading of data from the memories is carried out in a fashion similar to the writing operation except that data may be written simultaneously into the memories (such as the side scan A memories and the auxiliary A memory) whereas data is read from only one memory at a time. The memory from which data is to be read is determined by a "select" signal on one of the "select" leads 320 and 324 and by "read enable" signals applied to leads 346 and 350. The "select" signal activates the output data multiplexer 86 to couple either the A input ports of the multiplexer (if a logical "1") is received over the "A select" lead 320) or the B input ports (if a logical "1" is received over the "B select" lead 324) to the output ports of the multiplexer. The determination of which A memories or B memories to enable and the sequence of such enabling is made by the control multiplexer 316 in response to the "read enable" signals received over leads 346 and 350. That is, the control multiplexer 316 may receive in sequence three different combinations of signals over leads 346 and 350 indicating that the port side scan memory A is to be enabled to read out its data, followed by the starboard side scan memory A and then the auxiliary memory A. This would be the case for the split trace display mode. Alternatively, if the system were operating in the "auxiliary only" display mode, the only one combination of signals would be applied to leads 346 and 350 to "instruct" the control multiplexer 316 to enable only the auxiliary A memory, etc. The control multiplexer controls such enabling by way of leads 334 and 336 connected to the two memories shown, and by way of lead pairs 335 and 337 which are connected to the other two memory pairs. The locations or addresses from which data is to be read are determined by information supplied over a read address bus 354. The address multiplexer 312, in response to this information, enables the designated addresses in the selected memory from which data is to be read. The output data multiplexer 86 simply applies the data read from the memories to the polarity control unit 90 (FIG. 1).

The memories 304 and 308 are operated alternately in the "write" and "read" mode so that while one memory is storing data, the other memory may be applying data to the output data multiplexer 86 and vice versa. Each memory stores digital data representing one reflected acoustical signal so that after such data is stored in one of the memories, data representing the next reflected acoustical signal is stored in the other memory and the previously stored data is read from the one memory. The data read from a memory is applied to the recorder unit to control the recording of information over one stylus sweep across the appropriate portion (auxiliary, port side or starboard) of the chart paper.

The rate at which information is written into the memories is controlled by the rate at which data is supplied over the bus 256, the rate at which the address information is supplied over the write address bus 328, and the rate at which "write enable" signals are supplied over lead 332. Similarly, the rate at which data is read from the memories is controlled by the rate at which address information is supplied over the read address bus 354 and the rate at which "read enable" signals are supplied over leads 346 and 350. As earlier mentioned, controlling the writing and reading rates enables controlling the scale factors of the display and controlling the compression of a portion of the display.

The sampling of the analog signals from the transducers, the storing in memory of the digital samples, and the reading of digital information from memory is all done under control of the programmer and control unit 60 (FIG. 1). This unit could be a standard general purpose computer, but for the system embodiment described herein, a special purpose, hard wired unit is provided. The programmer and control unit is shown in detail in FIG. 5 to include a multi-rate clock generator 404, a speed control PROM (programmable read only memory) 408 for controlling the speed at which the stylus in the recorder unit is moved, a read control PROM 412 for controlling the rate at which and locations from which data is read from the memories, and a write control PROM 416 for controlling the rate at which analog signals are sampled and the digital samples are stored in memory. Also included are a number of counters, a control logic unit 420 and a delay logic unit 424, the latter two of which are shown in greater detail in FIGS. 6 and 7 respectively. The programmable divide-by-N counters are standard counters which count down to zero from some input value N, after which they produce an output signal. The PROM's are standard elements which may be programmed to produce various outputs in response to input signals. Exemplary PROM'S are the model 6330 made by Monolithic Memories, Inc.

As indicated earlier, the speed of the stylus is under the control of the speed control PROM 408. This PROM supplies a value N to a programmable divide-by-N counter 432 to thereby determine the frequency of output pulses generated by the counter. The larger the value N, the less frequent are the pulses produced by the counter 432 and vice versa. The rate at which the counter 432 counts down from N is determined by the frequency of output pulses from another counter 428 which, in turn, produces these output pulses periodically in response to a clock signal received from the clock 404. The pulses produced by the counter 432 are applied to a phase/frequency detector 436 which compares the frequency thereof with the frequency of a signal received from a stylus motor tachometer (which indicates the speed of the motor). If the two inputs have the same frequency, the detector continues to apply a signal to the stylus motor of the same duty cycle as that previously applied. If the two inputs do not have the same frequency, then the detector 436 varies the duty cycle of its output signal (error signal) to either increase or decrease the speed of the stylus motor and thereby change the frequency of the signal coming from the stylus motor tachometer so that it matches the frequency of the pulses received from the counter 432. In this manner, changing the value of N applied to the counter 432 changes the speed of the stylus motor and thus the speed at which the stylus is moved. This is a standard phase lock loop arrangement.

The speed control PROM produces the digital signal having the value N in response to an input from the delay logic 424 (and, of course, as a result of the program stored in the PROM). The delay logic 424 produces the digital information which is applied to the PROM 408 in response to information from the control logic unit 420. The control logic unit 420 in effect determines the speed of the stylus and this speed varies with variation in the range setting and the amount of expansion/compression (in the auxiliary channel). This will become evident when the control logic unit 420 and the delay logic unit 424 are described in detail.

Control of writing or storing data in the memories is effected by the write control PROM 416. Information is supplied to the PROM 416 from the manual switch panel 64 (FIG. 1) and such information includes information as to the side scan range, the auxiliary channel range and the mode of display. Although only three input leads are shown to the PROM 416, it should be understood that these are only representative of the kinds of information supplied and more leads may be required. From the supplied range and mode information, the PROM 416 produces a side scan control output 440 for controlling the rate at which the analog signals from the side scan channels are sampled and the rate at which the corresponding digital information is stored, and an auxiliary control output 442 for controlling the rate at which the analog signals from the auxiliary channel are sampled and the rate at which the corresponding digital information is stored. These rates are varied with variation in the selected range. For example, if the display mode selected is "auxiliary only", and the auxiliary range setting is quite short, then, since transmission and reception of the acoustical signal for the selected range is quite short in time, the rate of sampling and storing the received signals would be relatively faster (in order to obtain the samples necessary to fill the corresponding memories in the inter-transmission time alotted). On the other hand, if the auxiliary range setting were quite long, then, since the time for transmission and reception of each acoustical signal must necessarily take longer, the rate of sampling and storing the received signals is decreased.

Recall that when describing the digitizers of FIG. 3, it was pointed out that the sampling and storing rate was determined by a value N supplied to a divide-by-N counter 232. This value is supplied by the write control PROM 416, with the two side scan digitizers 40 and 44 (FIG. 1) receiving one value depending upon the side scan range setting, and the auxiliary digitizer 48 receiving a value depending upon the auxiliary range setting. The values are supplied over buses 440 and 442 of FIG. 5.

The two outputs from the write control PROM 416 are also supplied to a side scan divide-by-N counter 446 and to an auxiliary divide-by-N counter 448. These counters, together with corresponding counters 452 and 454, determine the locations or addresses in the memories where the digitized information is to be stored. The rates at which the counts in counters 452 and 454 change, of course, correspond to the rates of storing the information. The side scan write address counter 452 increments with each output pulse received from the counter 446, such output pulses being produced every time the counter 446 counts down to zero. Similarly, the auxiliary write address counter 454 increments with each output pulse either from the counter 448 or from a delay frequency lead 456 (to be discussed momentarily).

The counts in counter 452 are supplied to the side scan write address bus 47 of FIG. 1 and the counts in counter 454 are supplied to the auxiliary write address bus 45 of FIG. 1.

The output of the side scan divide-by-N counter 446 is supplied to the side scan digitizers 40 and 44 (FIG. 1), and in particular to phasing logic 260 (FIG. 3) of the digitizers to control the sampling and storing of data in the side scan memories as previously described. Either the output of the auxiliary divide-by-N counter 448 or the signal on lead 456 is supplied via an EXCLUSIVE-OR gate 458 to the phasing logic (260 of FIG. 3) of the auxiliary digitizer 48 (FIG. 1) to control the sampling and storing of data in the auxiliary memories. The output of the counter 448 is supplied to the auxiliary digitizer when the system is not operating in the "expand" mode. When in the "expand" mode, an "auxiliary counter inhibit" signal is supplied to the counter 448 via lead 460 to prevent it from counting for a certain period of time during the sampling and storing of each received acoustical signal of the auxiliary channel (i.e., during one trace on the chart of auxiliary data). During the time the counter 448 is inhibited, a "delay frequency" clocking signal is supplied by the delay logic 424 to the EXCLUSIVE-OR gate 458. When the counter 448 is not inhibited, it, of course, supplies pulses to the EXCLUSIVE-OR gate 458 and the delay logic 424 removes the "delay frequency" signal. The effect of this is to provide for compressing a portion of the display by sampling and storing portions of the received auxiliary analog signals less frequently (when the lower frequency pulses from the delay logic 424 are being applied to the EXCLUSIVE-OR gate 458) than normal, and then by sampling and storing the remaining portions of the analog signals at the higher normal rate (when the higher frequency pulses from the counter 448 are being applied to the EXCLUSIVE-OR gate 458). This stored data is then read from the auxiliary memories at a uniform rate so that the less frequently sampled portion of the analog signal appears in the compressed portion of the display and the more frequently sampled portion of the analog signal appears in the non-compressed portion of the display. The amount of compression may be varied simply by varying the frequency of the signal applied via lead 456 to the EXCLUSIVE-OR gate 458.

An $\overline{SS\ Blank}$ lead 462 is provided from the control logic unit 420 to the counter 446 simply to reset the counter after each transmission, reception and storing of side scan signals, i.e., after counter 452 reaches its maximum count.

The most significant bit of each of the counters 452 and 454 is supplied to the control logic unit 420 via lead 464 and bus 466 respectively so that such bit of whichever of the two counters is the last to reach its maximum count will cause the control logic unit to produce an EOC (end of count) signal which is applied to the delay logic 424 to terminate the counting of a counter contained therein. The count of such counter is supplied to the speed control PROM 408 to ultimately control the speed at which the stylus is moved. The reason for using the most significant bit of the counter 452 or 454 to last reach its maximum count is that such counter is operating to provide the greatest display range for its respective channel, and the channel set to provide the greatest display range determines the speed of the stylus.

In addition to supplying its most significant bit to the control logic unit 420, the auxiliary write address counter 454 also supplies additional bits to the $\overline{\text{control logic unit}}$ to cause it to periodically produce an $\overline{\text{auxiliary blank}}$ signal which, in turn, is supplied to the auxiliary digitizer to prevent sampling a certain amount of the last portions of the auxiliary analog signals. This simply provides some margin at the end of each auxiliary trace.

Control of the reading of data from the memories is similar to control of the writing of data into the memories except that reading of data must be done sequentially and not in parallel as with writing of data. Thus, a single read address counter 474 is provided and this counter provides the address information for reading data from all three channels or sets of memories. The reading operation is carried out under control principally of the read control PROM 412 and partially of the speed control PROM 408. Specifically, the speed control PROM 408 supplies a value N to a programmable divide-by-N counter 472 to govern the total time over which data is to be read from the memories for display. This total time, of course, is dependant on the stylus scan time and thus on the stylus speed which itself is determined by the value of N produced by the speed control PROM 408.

The read control PROM 412 determines rates at which data is read from each pair of memories and these rates may be different as earlier mentioned to provide different scale factors for the different channels. Thus, the read control PROM may generate one value N for reading from the side scan memories and another value of N for reading from the auxiliary memories and, in this manner, provide for reading and recording the side scan data at a rate different from the rate of reading and recording the auxiliary data.

The values of N produced by the read control PROM 412 are determined in response to mode information supplied over input leads 72 (shown as a single lead) from the manual switch panel 64 (FIG. 1). That is, for "split trace" mode for example, the read control PROM 412 may be programmed to generate one value of N for the side scan portion of the display and a different value of N for the auxiliary portion of the displays etc. These values are supplied to a divide-by-N counter 470 to control the frequency of the output of the counter. This output, in conjunction with the N input from the speed control PROM 408, governs the frequency of the output pulses of counter 472. The output of counter 472, in turn, increments the read address counter 474 which successively supplies its counts to a buffer/inverter 476.

The buffer/inverter 476 is provided to invert the addresses for the read out of the side scan data for either the port side or the starboard when a center-out display is desired. By inverting the address of the first side scan channel, the side scan data in question is read out from its memory on a "first in/last out" basis rather than the normal "first in/first out" basis to thereby allow production of a center-out side scan display. The buffer/inverter is caused to invert a sequence of addresses in response to an inverter signal supplied by the read control PROM 412 over lead 482.

The output of the buffer/inverter 476 is supplied to the read address bus 354 of FIG. 4 to cause the sequential read out of the stored data. Read enable signals are supplied by the read control PROM 412 via leads 486 to the control multiplexer 316 of FIG. 4 to control the sequence in which data is read from the three pairs of memories as discussed earlier.

The read control PROM 412 is signalled over leads 484 after completion of each cycle of counting by the read address counter 474 (completion of one cycle causes the reading of the contents of one memory). That is, after the read address counter counts through a counting cycle in which the contents of a memory are read out, the counter signals the read control PROM 412. The read control PROM in this way is informed of the completion of read out of a memory, e.g., starboard side memory A, so that it can change the read enable signals on leads 486 to read from the next memory in sequence, e.g., auxiliary memory A. Also, the read control PROM 412 may change the value of N applied to the counter 470 to change the rate of reading from the next memory.

After a trace or scan of the chart has been completed, as indicated by the signals on leads 484 and by reason of "knowing" the display mode, the read control PROM 412 produces a "stop" signal which is applied to a NAND gage 490 to prevent further application of clock pulses from the clock 404 to the counter 470. Thus further reading is inhibited until the "stop" signal is removed which occurs when the signals on leads 484 are changed as a result of the read address counter being reset by control logic 420.

Figure 5:
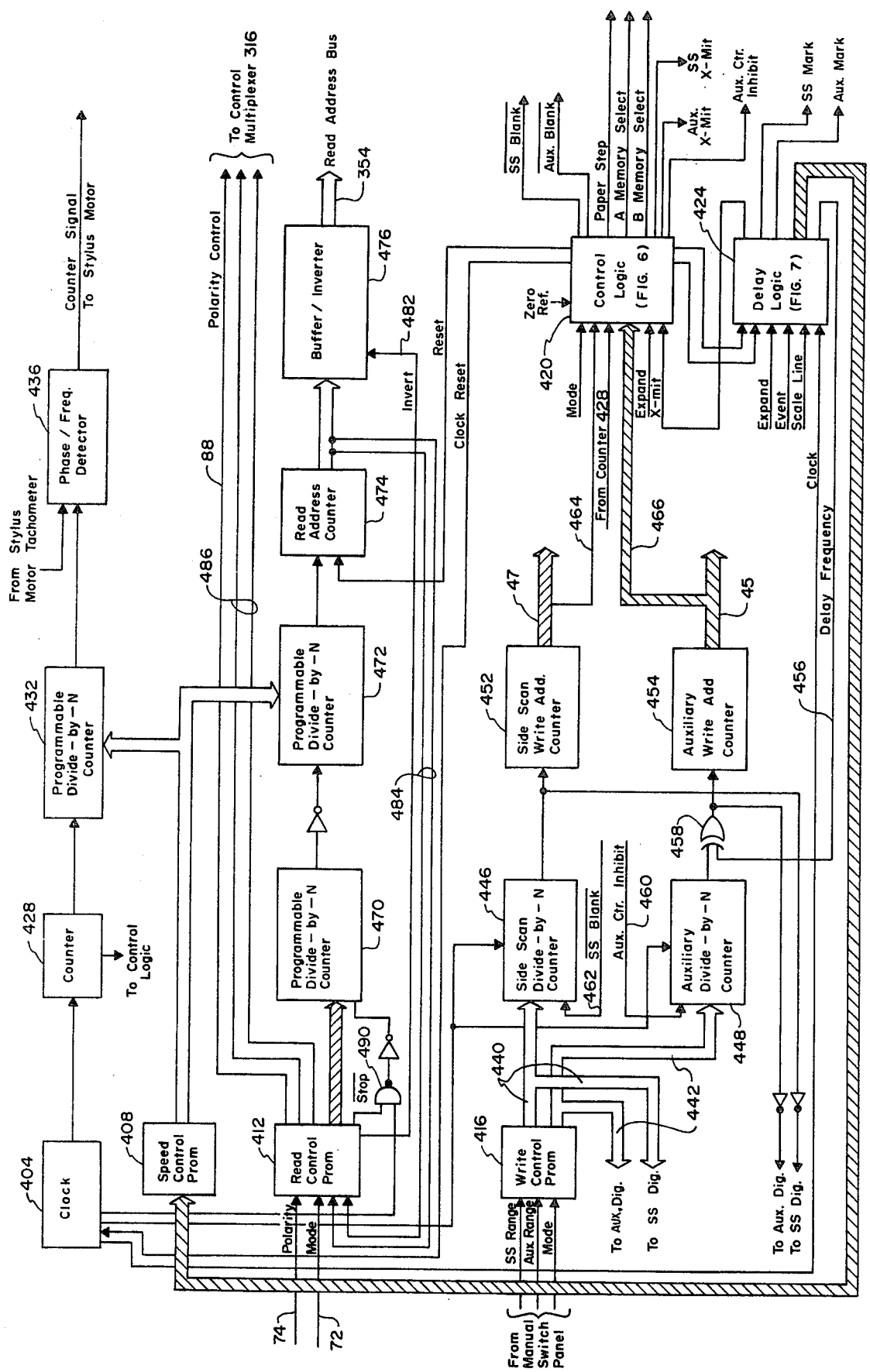
FIG. 5 shows in detail the construction of the programmer and control unit of FIG. 1.

The final function performed by the read control PROM 412 is to control the polarity of the display by way of polarity control lead 88 (FIG. 5 and FIG. 1). The read control PROM simply changes the signal state of lead 88 in response to the polarity signal input received over lead 74 from the manual switch panel 64 (FIG. 1).

Figure 6:
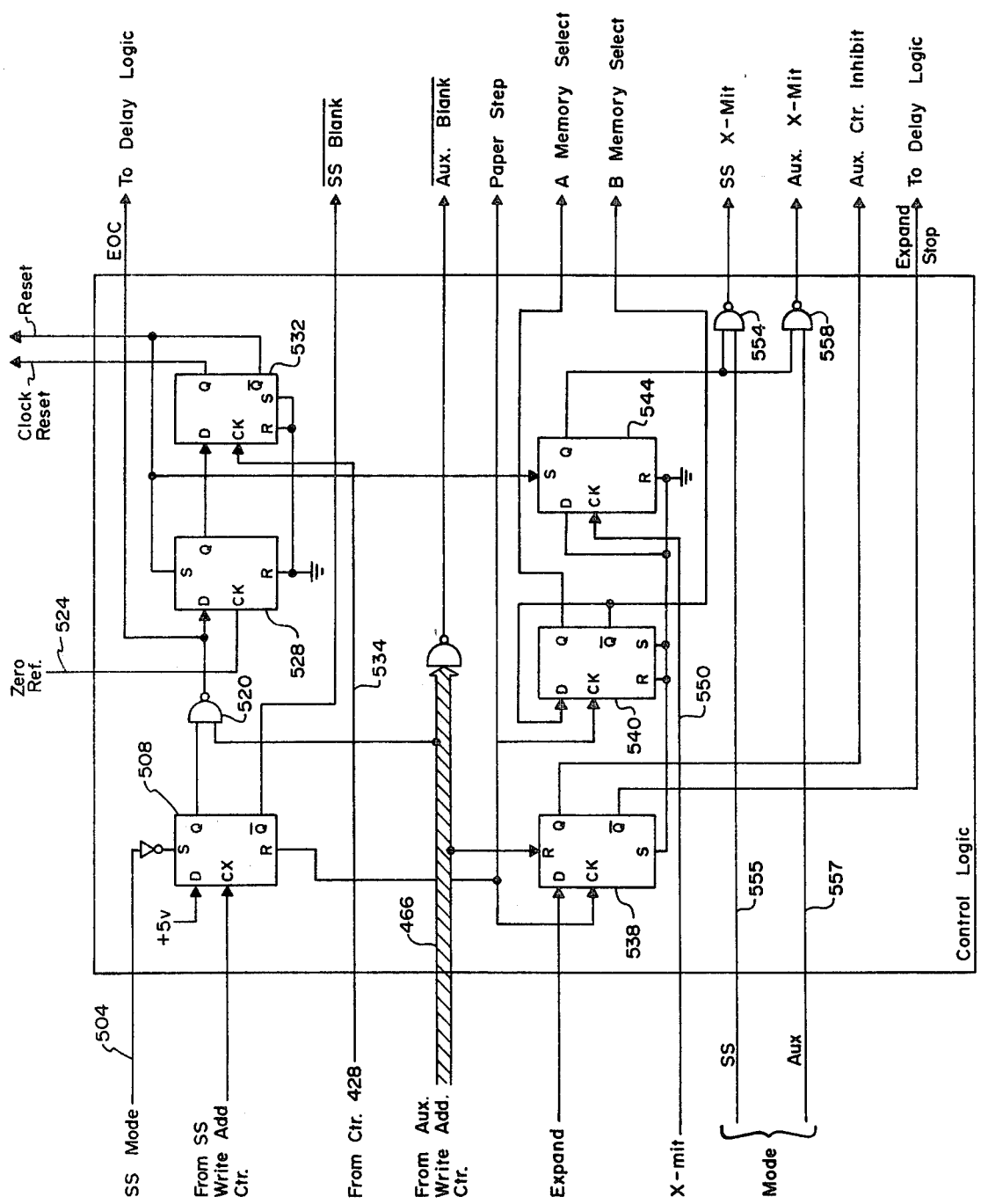
FIG. 6 shows an exemplary circuit embodiment for the control logic unit of FIG. 5.

An exemplary embodiment of the control logic unit 420 of FIG. 5 is shown in FIG. 6. The principal function of the control logic unit is to generate signals for synchronizing the operation of the system. The starting point for doing this is a zero reference signal supplied by the recorder unit 100 (FIG. 1) at the beginning of each sweep or scan of a stylus. This signal is derived in a variety of ways from presently used recorder units.

Among the signals generated by the control logic unit of FIG. 6 are the EOC signal discussed earlier, the $\overline{SS}$ Blank signal also discussed earlier which resets counter 446 (FIG. 5) and which is applied to the side scan digitizers to prevent further sampling thereby (see FIG. 3 and the description thereof), and the auxiliary blank signal which prevents further sampling by the auxiliary digitizer. When in either the "side scan only" or "split trace" mode, a logical "1" is applied to an SS mode lead 504 so that the input to the "set" terminal of a D-type flip-flop 508 is logical "0". When the write address counter 452 reaches the last count necessary to cause the storing of data in the side scan memories, the most significant bit (logical "1") of the counter is applied to the clock terminal of the flip-flop 508 so that the Q output of the flip-flop is made high. When this occurs and when the most significant bit from bus 466 becomes "1" and is applied to NAND gate 520, the output of the NAND gate becomes logical "0" which is the EOC signal. When the Q output of flip-flop 508 goes high, the $\overline{Q}$ output goes low and this is the $\overline{SS\ Blank}$ signal. The $\overline{SS\ Blank}$ signal is generated either each time the SS write address counter reaches its maximum count or continually when neither the "side scan only" nor "split trace" made is selected so that the input on lead 504 is a logical "0". In the latter case, the flip-flop 508 is maintained in the set state so that the $\overline{Q}$ output is maintained low.

The logical "0" output of NAND gate 520, together with a "zero reference" signal applied over lead 524 cause a D flip-flop 528 to produce a low signal on its Q output which is applied to the D input of another D flip-flop 532. Upon application of logical "1" to lead 534 by counter 428 (produced when the counter reaches a certain count), the flip-flop 532 produces a low signal on its Q output and a high on its $\overline{Q}$ output, the former being used as a reset signal for clock 404 (FIG. 5) and the latter being used as a reset signal for other circuitry of the system.

The auxiliary blank signal is produced when a certain count is reached by the auxiliary write address counter 454 as is evident from FIG. 6.

The control logic unit of FIG. 6 also produces a "paper step" signal (which is the same as the reset signal) which is applied to the recorder unit 100 (FIG. 1) to cause the advancement of the chart paper by a corresponding chart paper motor. The amount of advancement is determined by the selected line density—a control adjustment which may be made on conventional recorder units.

D type flip-flop 540 of the control logic unit controls the generation of the "memory select" signals which are applied to the multiplexers shown in FIG. 4. When the Q output of flip-flop 540 is high (A memory select), the $\overline{Q}$ output thereof is low (B memory select), and vice versa. These outputs alternate between high and low conditions in response to the reset signal produced by flip-flop 532 so that during one sweep of the recorder stylus, one of the outputs is high and during the next sweep, the other output is high, etc.

Another D type flip-flop 544 is provided to control the transmission of acoustical signals from the side scan and auxiliary transducers. This flip-flop produces a high on its Q output each time a reset signal is produced by flip-flop 532 and terminates the output in response to a "x-mit" signal received from the delay logic 424 (FIG. 5) over lead 550. The Q output of flip-flop 544 is applied to NAND gates 554 and 558 for ultimate application to the transducer circuitry, depending upon the selected display mode. If the "side scan only" is selected, then a logical "1" is applied by the manual switch panel 64 to lead 555 to enable NAND gate 554. If the "auxiliary only" mode is selected, NAND gate 558 is enabled by a logical "1" received over lead 557, and if the "split trace" mode is selected, then both NAND gates 554 and 558 are enabled to apply "transmit" signals to the transducer circuitry.

The last D type flip-flop 538 of the control logic unit is provided in connection with the expand mode of operation. When in the expand mode, a high signal is applied by the manual switch panel 64 to the "D" input of the flip-flop 538. The flip-flop 538 produces an auxiliary counter inhibit" signal on its Q output upon being clocked by the reset signal from flip-flop 532. This signal is maintained until the flip-flop 538 is reset by one of the bits from the auxiliary write address counter 545 (FIG. 5). While the flip-flop maintains this signal output, the auxiliary divide-by-N counter 448 (FIG. 5) is inhibited from counting and the delay logic 424 supplies a "delay freq." signal to the auxiliary digitizer 48 (FIG. 1) for controlling the sampling of auxiliary channel analog signals, as earlier described. When the flip-flop 538 is reset, the "auxiliary counter inhibit" signal is removed so that the auxiliary divide-by-N counter 448 may count, and the flip-flop 538 generates an "expand stop" signal on its $\overline{Q}$ output which is applied to the delay logic 424 to inhibit generation of the "delay freq." signal. In other words, the amount of time the flip-flop 538 generates the "auxiliary counter inhibit" signal determines the amount of compression the auxiliary display is to have. Of course, as described above, the amount of time the flip-flop 538 generates the "auxiliary counter inhibit" signal is determined by which bit of the output of the auxiliary write address counter 454 is selected to reset the flip-flop.

Figure 7:
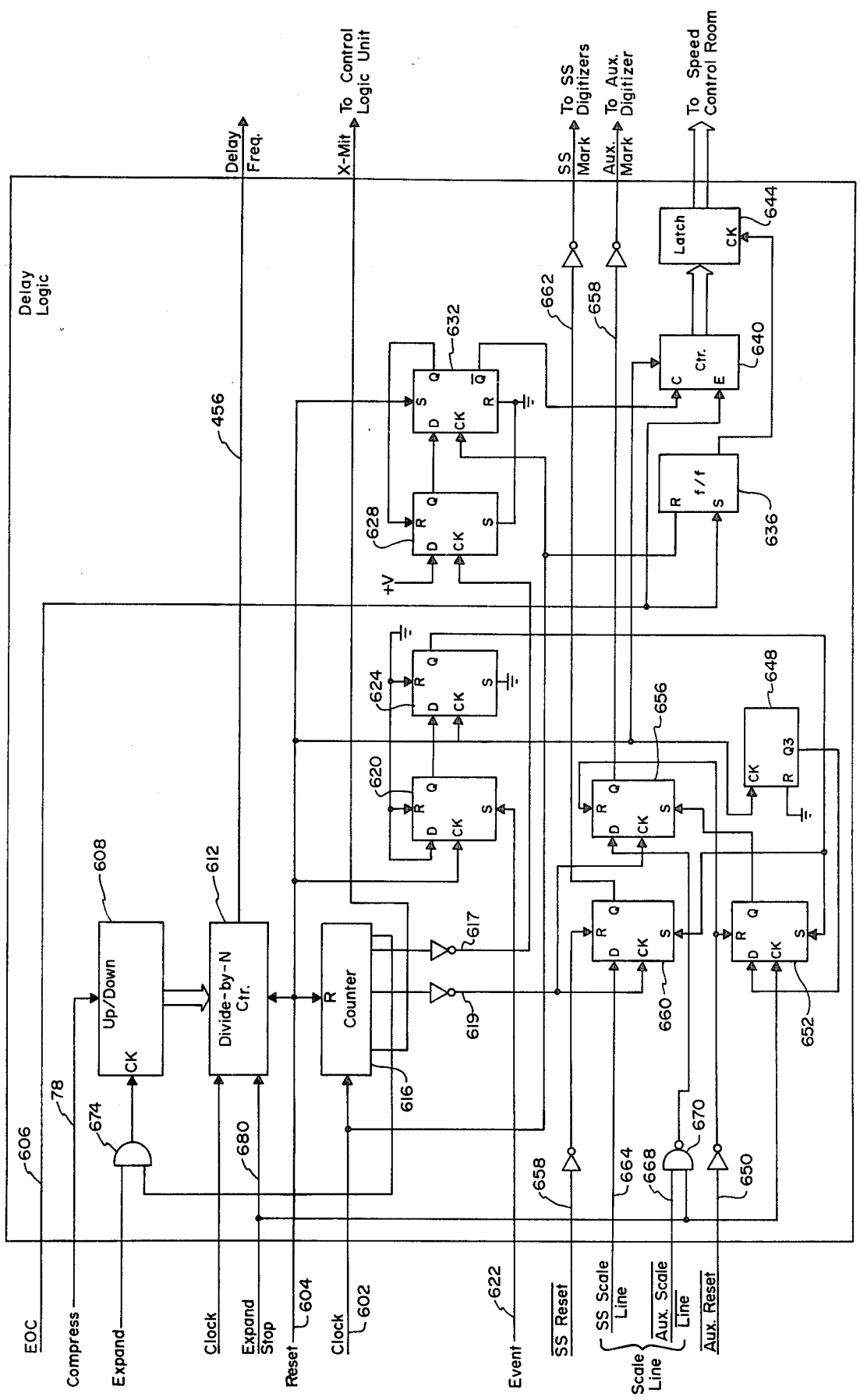
FIG. 7 shows an exemplary circuit embodiment for the delay logic of FIG. 5.

An illustrative embodiment of the delay logic 424 of FIG. 5 is given in FIG. 7. The delay logic 424 functions in conjunction with the control logic unit 420 to control the expand mode operation and also to control production of stylus speed control information, scale lines and event marks. Referring to FIG. 7, there is shown a "reset" input lead 604 over which reset signals are applied by the control logic unit 420 (FIG. 5) to clear or initialize a divide-by-N counter 612, a counter 616, D type flip-flops 620, 624 and 632, flip-flop 648 and counter 640. Recall that a reset signal is generated by the control logic unit in response to receipt of a "zero reference" signal which is produced by the recorder unit 100 (FIG. 1) at the beginning of a stylus sweep.

A clock signal applied by the clock 404 over lead 602 causes the counter 616 to increment, and after the counter reaches a certain count Y, a signal is produced on output lead and applied to flip-flop 628. This causes flip-flop 628 to produce a signal on its Q output which, coincident with the next clock signal on input 602, causes flip-flop 632 to produce a signal on its Q output to reset flip-flop 628 and to produce a signal on its $\overline{Q}$ output which increments the counter 640. The counter 616 continues to increment to cause application of an incrementing signal to counter 640 for every count of Y by the counter 616. The output of the counter 640 is applied to a latch circuit 644. Upon receipt of the previously described EOC signal over lead 606 from the control logic unit, a flip-flop 636 is "set" to apply a signal to the latch circuit 644 causing the latch circuit to "latch" at its output the count then present in the counter 640. The output of the latch circuit 644, which represents the required stylus speed, is applied to the speed control PROM 408 (FIG. 5), as earlier described.

The count reached by counter 640, and thus the stylus speed, is determined by the channel having the longest range setting and thus the longest write time since this is what determines production of the EOC signal. The flip-flop 636 is reset by the clock input received over lead 602 and the counter 640 is reset by thereset signal received over lead 604. The latch circuit 644 maintains its output until the next EOC signal causes the latch circuit to "latch" the count then in the counter 640. Of cource, if the longest range setting is changed, then the count reached by the counter 640 would change and so would the output of the latch circuit.

The delay logic of FIG. 7 controls production of an event mark (for one or more stylus sweeps) in response to signals received over lead 622 from the manual switch panel 64 (FIG. 1). When an "event mark" signal is received over lead 622, flip-flop 620 is "set" to produce a logical "1" on its Q output. This causes flip-flop 624 to produce a logical "1" on its Q output and this is applied to two D flip-flops 652 and 660 to "set" the flip-flops. Setting flip-flop 652 causes it to "set" a D flip-flop 656. As a result of all this, the flip-flops 656 and 660 produce outputs on leads 658 and 662 respectively which are applied to the auxiliary digitizer and side scan digitizers respectively to cause the digitizers to produce maximum digital values. These values will then result in the recorder unit 100 producing a dark (or light if a negative display is being produced) event mark line 108 (FIG. 1). This condition persists until the signal on lead 622 is removed and reset signals, produced by the digitizers and received over leads 650 and 658, have reset flip-flops 652, 656 and 660, and the reset signal received over lead 604 has clocked flip-flops 620 and 624. The resetting will nor occur until after the completion of the stylus sweep.

Scale lines are caused to be generated by the delay logic so that the scale line separation represents on the graphic display some predetermined distance or range such as, for example, seventy-five feet. If the user desires scale lines to be produced on the display, he simply operates switches on the panel 64 causing it to apply a signal to lead 664 (for scale lines on the side scan display), to lead 668 (for scale lines on the auxiliary display) or to both (for scale lines on both the side scan and auxiliary displays). The interval or separation of the scale lines is determined by counter 616 which clocks, via lead 619, both flip-flops 656 and 660 each time the counter counts through a count of Z. This causes the flip-flops 656 and 660 to produce signals on leads 658 and 662 to cause corresponding digitizers to produce the maximum digital value possible for storage. The flip-flops 656 and 660 are then reset by reset pulses received over leads 650 and 658, which occur after the digitizers complete each sampling. Thus, the maximum digital value is only stored for one sample time by the digitizers until the flip-flops 656 and 660 are again clocked. The result is that a spaced-apart series of marks are produced on the display chart for each stylus sweep and these marks compose the scale lines.

When in the expand mode, NAND gate 670 allows for the production of scale lines on the auxiliary display even though the auxiliary scale line switch on the manual switch panel 64 is "off". Some of these scale lines may be "compressed" in the portion E of the chart 120 as shown in FIG. 2. If in the expand mode, a high signal is applied to AND gate 674. An output from counter 616 is thus allowed to gate through the AND gate 674 to an up/down counter 608. The output from the counter 616 is produced each time the counter 616 counts through some predetermined count. The counter 608 is caused to count up or down or to maintain its count depending upon the signals on lead 78 which are produced by the manual switch panel 64 of FIG. 1. The user may operate a switch on the panel to produce an "up" signal, a "down" signal, or a neutral signal to respectively cause the counter 608 to count up or down in response to signals received from the counter 616, or to maintain its count.

The count produced by the up/down counter 608 is applied to a divide-by-N counter 612 which operates, in response to a clock input from clock 404, to produce the "delay freq." signal, earlier described. The frequency of this signal, of course, may be changed by changing the count output from the counter 608 and, in this manner, the amount of compression on the auxiliary display may be varied.

An "expand stop" input signal over lead 680 (produced by the control logic unit of FIG. 6) inhibits operation of the counter 612 for the period of time that the normal sampling signal from the auxiliary divide-by-N counter 448 (FIG. 5) is being supplied to the auxiliary digitizer. Thus, the "expand stop" signal is applied when the normal sampling rate for the auxiliary digitizer is used, and not applied when the "delay freq." signal rate is used to effect compression of a portion of the auxiliary display.

A "dashed line" 132 (FIG. 2) is produced on the chart paper when in the expand mode to identify the compressed portion of the display. This is accomplished by counter 648 and flip-flop 652 which cause the setting of flip-flop 656. The counter 648 is adapted to produce a high output for a predetermined number of reset signals on lead 604 and then a low output for the predetermined number. These outputs are applied to the flip-flop 652 and, when clocked by the "expand stop" signal, the flip-flop applies the outputs to the flip-flop 656. The result is that a dark mark (or light mark if producing a negative display) is produced on the chart between the compressed portion E and the normal portion F of the auxiliary display for the predetermined number of stylus sweeps, and then not produced for the predetermined number of stylus sweeps, etc. This provides the dashed line shown in FIG. 2.

It is to be understood that the above-described arrangement is only illustrative of the application of the principles of the present invention. Numerous modifications and alternative arrangements may be devised by those skilled in the art without departing from the spirit and scope of the invention and the appended claims are intended to cover such modifications and arrangements. For example, although digital storage of data received over the channels has been shown, analog storage could also be used. Further, there are various ways of implementing the specific functions of the invention, and numerous modifications of the illustrative circuits could be made. The manual switch panel 64 was not shown in detail since it consists simply of manually operable switches which, when placed in different settings, produce input signals to the programmer and control unit 60.

What is claimed is:

1. A graphic recorder system for use in recording sonar information and the like received over one or more information channels, said system comprising
    first memory means for storing information received over an information channel and including two storage areas dedicated to such channel,
    means for applying information received over such channel alternately to one storage area and then to the other storage area,
    means for recording on a recording medium a graphic representation of sequentially supplied information, said recording means being adapted to record the graphic representation of the supplied information as the information is received to thereby produce a representation having distance scale factors dependent upon the rate at which information is supplied to the recording means, and
    means for reading information alternately from one of said storage areas while information is being applied to the other storage area, and then from the other of said storage areas while information is being applied to the one storage area, and for applying the information sequentially to said recording means at selectable and variable rates.

2. A system as in claim 1 wherein said reading means is adapted to apply information to the recording means in either of at least two selectable sequences.

3. A system as in claim 2 wherein said first memory means stores information in the sequential order received, and wherein said reading means is adapted to selectively apply the information stored in the first memory means to the recording means in either the order in which the information was stored, or the inverse order.

4. A system as in claim 1 wherein the information received from said channels is analog information, said system further comprising
    analog to digital converting means for converting the analog information received over an information channel to digital information for storing the digital information in said memory means, and
    digital to analog converting means for converting digital information read from the storing means into analog information for application to the recording means.

5. A graphic recorder system for use in recording sonar information and the like received over one or more information channels, said system comprising
    first memory means for storing in binary form information received over an information channel,
    means for recording on a recording medium a graphic representation of sequentially supplied information,
    means for reading binary data from said memory means and for applying the data sequentially to said recording means at selectable rates, and
    means for selectively inverting the binary data prior to application thereof to said recording means, to thereby produce either positive or negative graphic displays.

6. A graphic recorder system for use in recording sonar information and the like received over two or more information channels, said system comprising
    first memory means for storing information received over one of said information channels,
    second memory means for storing information received over the other of said information channels simultaneously with the receipt and storage of information by said first memory means,
    means for recording on a recording medium a graphic representation of sequentially supplied information, and
    means for reading information sequentially from selected memory means and for applying the information sequentially to the recording means.

7. A system as in claim 6 wherein said reading means is adapted to apply information from one memory means to the recording means at a rate different from that at which information from another memory means is applied to the recording means.

8. A graphic recorder system for use with multiple channel underwater sonar apparatus which produces for each channel analog signals representing reflected sonar signals, said system comprising
    multiple digitizer means, each for converting analog signals received from a different channel to corresponding digital information,
    multiple memory means for storing digital information,
    means for applying digital information from each digitizer means to a corresponding memory means,
    digital-to-analog converter means for converting digital information from the memory means to corresponding analog signals,
    means for recording on a recording medium a graphic representation of signals sequentially supplied from said digital-to-analog converter means, said graphic representation displaying distances of underwater features encountered by the reflected sonar signals and having distance scale factors dependent upon the rate at which signals are supplied to the recording means, and means for reading information from said memory means and for supplying the information to said digital-to-analog converter means at selectable and variable rates.

9. A system as in claim 8 wherein each of said memory means comprises first and second storage elements, wherein said applying means includes means for applying digital information from a digitizer alternately to a first storage element and then a second storage element of a corresponding memory means, and wherein said reading means includes means for reading digital information alternately from the first and second storage elements of each memory means and for applying the digital information sequentially to said digital-to-analog converter means.

10. A system as in claim 8 wherein the digital information stored in the memory means comprises binary data, said system further comprising means for selectively inverting binary data read from the memory means prior to application of the data to the digital-to-analog converter means to thereby enable production by the recording means of either positive or negative graphic displays.

11. A system as in claim 8 wherein each of said digitizer means comprises means for successively producing digital counts representing digital information corresponding in value to the magnitude of a received analog signal sampled at successive instances of time, means for selectively varying the rate of sampling the analog signal to produce the digital counts, and means for signaling the memory means to store the digital counts produced by said digital count producing means.

12. A system as in claim 11 wherein said digital count producing means comprises a counter for incrementing its count in response to a received pulse, and wherein said sampling rate varying means comprises a digital-to-analog converter for converting the count in said counter to an analog signal, means for producing pulses at selectable intervals for application to said counter, means for inhibiting application of pulses from said pulse producing means to said counter when the analog signal produced by the digital-to-analog converter equals or exceeds the magnitude of the received analog signal, and means for periodically resetting said counter.

13. A system as in claim 8 wherein said applying means comprises means for enabling one of said memory means to store digital information at a rate proportional to the frequency of an input signal, first signaling means for producing a first signal having a selectable frequency, second signaling means for producing a second signal having a variable frequency which is lower than the frequency of said first signal, and means for selectively supplying either said first signal or said second signal to said enabling means as an input signal.

14. A system as in claim 13 wherein said first signaling means comprises a divide-by-N counter, and wherein said second signaling means comprises a divide-by-N counter and an up/down counter for suppling a count of N to the divide-by-N counter of the second signaling means.

15. A system as in claim 8 wherein said reading means comprises means responsive to received input signals for successively producing addresses which identify locations in the memory means from which digital information is to be read, means responsive to each address for enabling the memory means to apply to the digital-to-analog converter means the digital information stored at the location in the memory means identified by said each address, and means for producing and applying input signals, at selectable rates, to said address producing means to thereby cause said address producing means to produce an address each time an input signal is applied thereto.

16. A system as in claim 15 wherein said input signal producing means comprises a divide-by-N counter which produces a signal each time it reaches a zero count after counting down from a count of N, and logic means for supplying to the divide-by-N counter digital signals of value N to reset the counter to begin counting downwardly from a count of N, where N is selectively variable.

17. A system as in claim 15 wherein said reading means further comprises means for inverting certain addresses produced by said address producing means to thereby cause the reading of certain digital information stored in the memory means in the inverse order in which it was stored.

* * * * *